US009404575B2

(12) United States Patent
Somerville et al.

(10) Patent No.: US 9,404,575 B2
(45) Date of Patent: Aug. 2, 2016

(54) TRANSMISSION UPSHIFT FLARE DETECTION AND MITIGATION

(75) Inventors: James Robert Somerville, West Bloomfield, MI (US); John J. Koenig, Howell, MI (US); Christopher A. Spangler, Shanghai (CN); Andriy Nikitin, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1670 days.

(21) Appl. No.: 11/968,974

(22) Filed: Jan. 3, 2008

(65) Prior Publication Data

US 2009/0005217 A1     Jan. 1, 2009

Related U.S. Application Data

(60) Provisional application No. 60/958,002, filed on Jun. 29, 2007.

(51) Int. Cl.
| | |
|---|---|
| *F16H 63/50* | (2006.01) |
| *F16H 61/04* | (2006.01) |
| *F02D 41/02* | (2006.01) |
| *F02P 5/15* | (2006.01) |
| *F02D 41/14* | (2006.01) |

(52) U.S. Cl.
CPC ............ *F16H 63/502* (2013.01); *F02D 41/023* (2013.01); *F02P 5/1504* (2013.01); *F16H 61/04* (2013.01); *F02D 41/1497* (2013.01); *F02D 2250/21* (2013.01); *F16H 61/0437* (2013.01); *F16H 2061/0477* (2013.01); *F16H 2306/42* (2013.01); *Y02T 10/46* (2013.01); *Y10T 477/688* (2015.01)

(58) Field of Classification Search
CPC ............ F16H 61/04; F16H 2061/0477; F16H 63/502; B60W 30/19; F02D 41/023; F02D 41/1497; F02P 5/1504
USPC ................. 477/101, 102, 107, 109–111, 115; 701/51, 53, 54
See application file for complete search history.

(56) References Cited

U.S. PATENT DOCUMENTS

| | | | | |
|---|---|---|---|---|
| 4,630,583 | A | * | 12/1986 | Suzuki et al. ................. 477/102 |
| 4,680,988 | A | * | 7/1987 | Mori ............................... 477/65 |
| 4,809,660 | A | * | 3/1989 | Marsh et al. .................... 477/52 |
| 4,933,851 | A | * | 6/1990 | Ito et al. ........................... 701/54 |
| 5,018,068 | A | * | 5/1991 | Aoki et al. ...................... 701/53 |
| 5,129,286 | A | * | 7/1992 | Nitz et al. ..................... 477/102 |
| 5,577,980 | A | * | 11/1996 | Vukovich et al. ............. 477/144 |

(Continued)

OTHER PUBLICATIONS

Isermann et al., Fault-Tolerant Drive-By-Wire Systems, Oct. 2002, IEEE Control Systems, vol. 22, Issue 5, pp. 64-81.*

*Primary Examiner* — Thomas G Black
*Assistant Examiner* — Sze-Hon Kong (57) ABSTRACT

A transmission control module comprises an actuation module and a flare control module. The actuation module controls actuation of a friction device used in shifting from a first transmission ratio to a second transmission ratio. The transmission ratio is based on an input speed of a transmission divided by an output speed of the transmission. The first transmission ratio is greater than the second transmission ratio. The flare control module selectively generates an engine torque reduction request when a measured transmission ratio is greater than a threshold during a shift from the first transmission ratio to the second transmission ratio.

20 Claims, 4 Drawing Sheets

(56) References Cited

U.S. PATENT DOCUMENTS

| | | | |
|---|---|---|---|
| 5,857,935 A * | 1/1999 | Takiguchi | 475/120 |
| 5,876,304 A * | 3/1999 | Takiguchi | 477/150 |
| 5,910,175 A * | 6/1999 | Malson | 701/57 |
| 6,014,603 A * | 1/2000 | Le Van | 701/52 |
| 6,041,275 A * | 3/2000 | Takiguchi | 701/55 |
| 6,122,583 A * | 9/2000 | Kirchhoffer et al. | 701/51 |
| 6,364,811 B1 * | 4/2002 | Hubbard et al. | 477/143 |
| 6,503,165 B1 * | 1/2003 | Kubo et al. | 475/125 |
| 6,991,583 B2 * | 1/2006 | Saitou et al. | 477/109 |
| 7,211,027 B2 * | 5/2007 | Sakamoto et al. | 477/107 |
| 2005/0096836 A1 * | 5/2005 | Minami et al. | 701/123 |

* cited by examiner

TRANSMISSION UPSHIFT FLARE DETECTION AND MITIGATION

CROSS-REFERENCE TO RELATED APPLICATIONS

This application claims the benefit of U.S. Provisional Application No. 60/958,002 filed on Jun. 29, 2007. The disclosure of the above application is incorporated herein by reference in its entirety.

FIELD

The present disclosure relates to engine flare in a transmission, and more specifically to mitigating detected engine flare during upshifts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
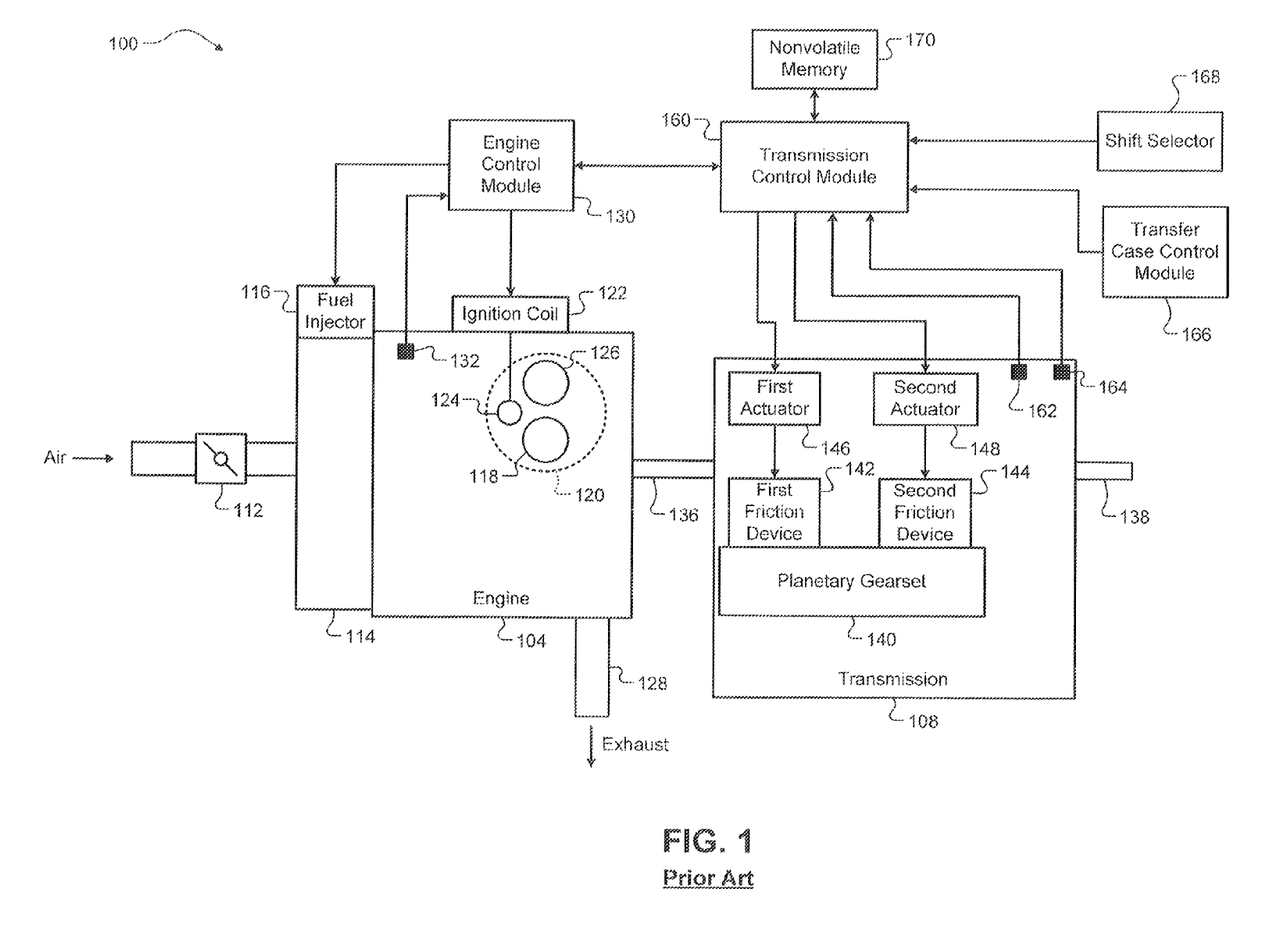
FIG. 1 is a functional block diagram of a vehicle powertrain according to the prior art.

Referring now to FIG. 1, a functional block diagram of a vehicle powertrain 100 is presented. The powertrain 100 includes an engine 104 and a transmission 108. Air is drawn through a throttle valve 112 into an intake manifold 114. An air-fuel mixture is created by injecting fuel from fuel injector 116 into the intake manifold 114. The air-fuel mixture is drawn through an open intake valve 118 into a representative cylinder 120. Alternatively, the fuel injector 116 may inject fuel directly into the cylinder 120.

An ignition coil 122 activates a spark plug 124 to ignite the air-fuel mixture within the cylinder 120. After ignition, an open exhaust valve 126 allows the cylinder 120 to vent the products of combustion to an exhaust system 128. An engine control module (ECM) 130 receives signals from sensors, such as an engine coolant temperature (ECT) sensor 132. The ECM 130 then controls various actuators of the engine 104, such as the fuel injector 116 and the ignition coil 122.

Torque from the engine 104 is output to the transmission 108 via a transmission input shaft 138. The transmission 108 outputs the torque to a driveline (not shown) via a transmission output shaft 138. The ratio between the speeds of the transmission input and output shafts 136 and 138 is controlled by a planetary gearset 140.

In various implementations, the planetary gearset 140 may be a complex planetary gearset, such as one including one ring gear, two sun gears, and two sets of planet gears. Alternatively, the planetary gearset 140 may include two or more complete sets of planetary gears, various components of which can be connected to each other and to the input and output of the planetary gearset 140.

The ratio between the input and output shafts 136 and 138 is determined by which of the components of the planetary gearset 140 are held stationary and/or connected to each other. Components of the planetary gearset 140 are controlled by a plurality of friction devices, including a first friction device 142 and a second friction device 144.

The first and second devices 142 and 144 are controlled by first and second actuators 146 and 148, respectively. The first and second actuators 146 and 148 are controlled by a transmission control module 180. The transmission control module 160 receives signals from various sensors, including a transmission fluid temperature sensor 162 and a transmission ratio sensor 164. The transmission ratio sensor 164 may determine the ratio by dividing the speed of the transmission input shaft 136 by the speed of the transmission output shaft 138. The transmission ratio sensor 164 may be located in the transmission 108 and may determine the speeds of the input and transmission output shafts 136 and 138 based on engine speed and wheel speed, respectively.

The transmission control module 160 receives data from the ECM 130. The transmission control module 160 may receive signals from a transfer case control module 166, such as may be implemented in a four-wheel-drive or all-wheel-drive vehicle. The transmission control module 160 receives signals from a shift selector 168, which is operated by a driver of the vehicle. For example only, the shift selector 168 may be a column-mounted or floor-mounted PRNDL lever. The transmission control module 160 receives calibration parameters from nonvolatile memory 170 and may store state information in nonvolatile memory 170.

SUMMARY

A transmission control module comprises an actuation module and a flare control module. The actuation module controls actuation of a friction device used in shifting from a first transmission ratio to a second transmission ratio. The transmission ratio is based on an input speed of a transmission divided by an output speed of the transmission. The first transmission ratio is greater than the second transmission ratio. The flare control module selectively generates an engine torque reduction request when a measured transmission ratio is greater than a threshold during a shift from the first transmission ratio to the second transmission ratio.

In other features, the engine torque reduction request instructs an engine control module to retard spark delivery to an engine. The flare control module determines an amount of spark retard from a lookup table. The lookup table is indexed by a speed of the engine. The flare control module determines the threshold from a lookup table. The lookup table is indexed by a speed of an engine. The actuation module increases a hydraulic pressure applied to the friction device when the measured transmission ratio is greater than the threshold during the shift.

In further features, the actuation module determines the hydraulic pressure increase from a lookup table. The lookup fable is indexed by shift torque and transmission fluid temperature. The flare control module maintains a count of occurrences of the measured transmission ratio being greater than the threshold. The actuation module increases a default hydraulic pressure to the friction device for the shift when the count is greater than a predetermined number.

In still other features, the transmission includes four forward transmission ratios, the first transmission ratio corresponds to a second-highest gear ratio of the four forward transmission ratios, and the second transmission ratio corresponds to a third-highest gear ratio of the four toward transmission ratios. The friction device comprises a band that is used to engage the second-highest gear ratio and a fourth-highest gear ratio of the four forward transmission ratios, and further comprises a second friction device that comprises a clutch that is used to engage the third-highest gear ratio and the fourth-highest gear ratio.

A method comprises controlling actuation of a friction device and selectively generating an engine torque reduction request. The friction device is used in shifting from a first transmission ratio to a second transmission ratio. The transmission ratio is based on an input speed of a transmission divided by an output speed of the transmission. The first transmission ratio is greater than the second transmission ratio. The engine torque reduction request is selectively generated when a measured transmission ratio is greater than a threshold during a shift from the first transmission ratio to the second transmission ratio.

In other features, the engine torque reduction request instructs an engine control module to retard spark delivery to an engine. The method further comprises determining amount of spark retard from a lookup table. The lookup table is indexed by a speed of the engine. The method further comprises determining the threshold from a lookup table. The lookup table is indexed by a speed of an engine. The method further comprises increasing a hydraulic pressure applied to the friction device when the measured transmission ratio is greater than the threshold during the shift.

In further features, the method further comprises determining the hydraulic pressure increase from a lookup table. The lookup table is indexed by shift torque and transmission fluid temperature. The method further comprises maintaining a count of occurrences of the measured transmission ratio being greater than the threshold. The method further comprises increasing a default hydraulic pressure to the friction device for the shift when the count is greater than a predetermined number.

In still other features, the transmission includes four forward transmission ratios, the first transmission ratio corresponds to a second-highest gear ratio of the four forward transmission ratios, and the second transmission ratio corresponds to a third-highest gear ratio of the four forward transmission ratios. The friction device comprises a band that is used to engage the second-highest gear ratio and a fourth-highest gear ratio of the four forward transmission ratios, and further comprises a second friction device that comprises a clutch that is used to engage the third-highest gear ratio and the fourth-highest gear ratio.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
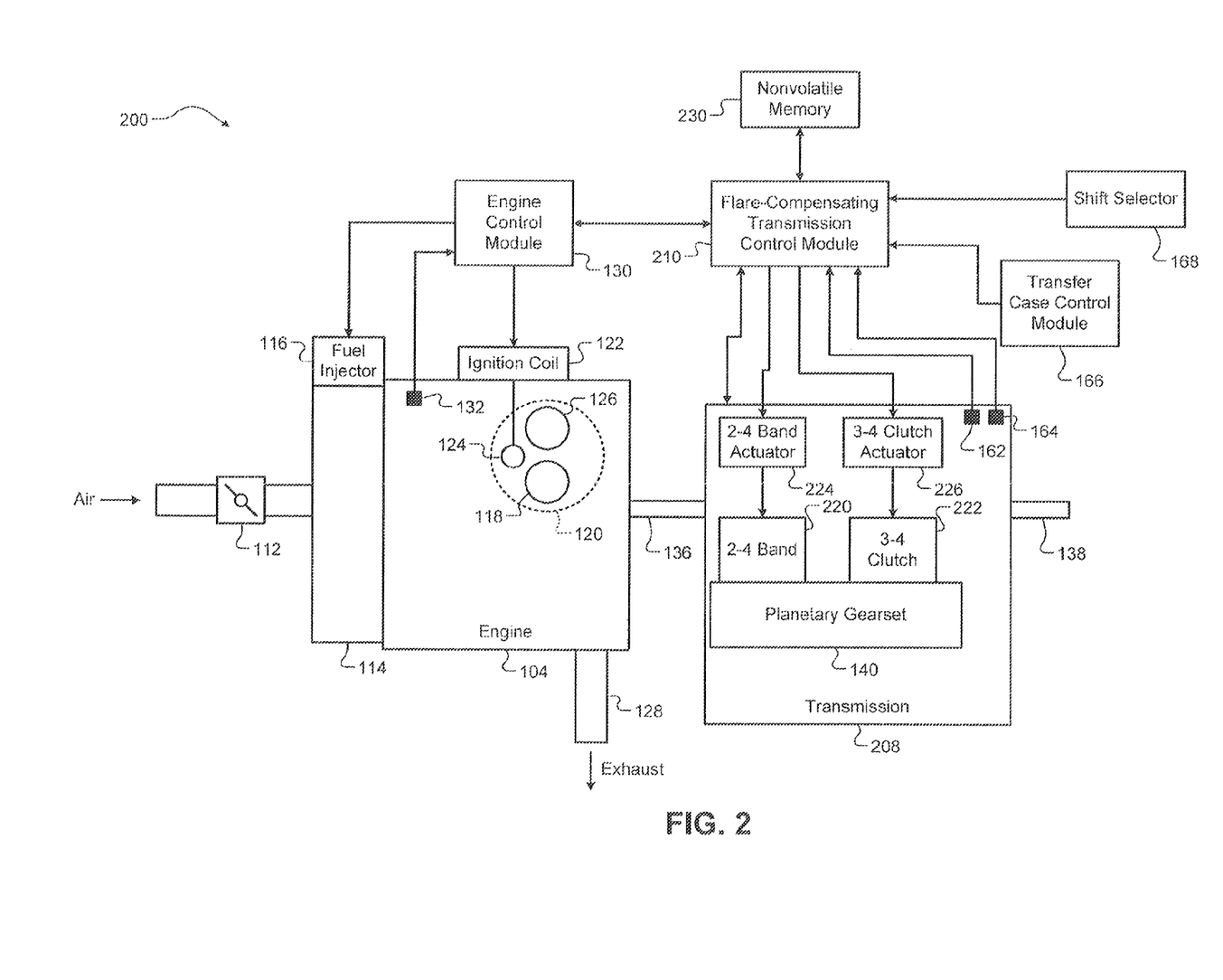
FIG. 2 is a functional block diagram of an exemplary vehicle powertrain according to the principles of the present disclosure.

Referring now to FIG. 2, a functional block diagram of an exemplary vehicle powertrain 200 is presented. A flare-compensating transmission control module (TCM) 210 communicates with the engine control module (ECM) 130. In various implementations, the TCM 210 and the ECM 130 may be implemented as a single module. During an upshift of a transmission 208, the TCM 210 may instruct the ECM 130 to reduce engine torque to reduce the speed of the engine 104. In this way, the lower speed of the engine 104 matches the higher gear ratio selected in the transmission 208.

For example only, the transmission 208 may have four forward gears and one reverse gear. The first forward gear has the highest ratio, the second forward gear has the second-highest ratio, etc. For simplicity of explanation, a shift from second to third gear will be described. For example only, a 2-4 band 220 may be used to hold one of the components of the planetary gearset 140 in place to achieve gears 2 and 4. A 3-4 clutch 222 may be used to couple two components of the planetary gearset 140 to achieve gears 3 and 4. The TCM 210 may also receive inputs from and control other actuators of the transmission 208, as indicated by the arrow between the TCM 210 and the transmission 208.

The 2-4 band 220 may include a servo-actuated frictional band, while the 3-4 clutch 222 may include a multi-plate wet clutch. The 2-4 band 220 and the 3-4 clutch 222 are controlled by a 2-4 band actuator 224 and a 3-4 clutch actuator 226, respectively. For example only, the 2-4 band actuator 224 may use hydraulic and/or electrical force to control a servo that tightens the 2-4 band 220 around a selected component in the planetary gearset 140.

Once the 2-4 band 220 is fully actuated, the selected component of the planetary gearset 140 may be locked to the housing of the transmission 208. For example only, the 3-4 clutch actuator 226 may use hydraulic pressure to engage plates of the 3-4 clutch 222. Once the plates of the 3-4 clutch 222 are fully engaged, selected components of the planetary gearset 140 are locked to each other and/or to the transmission input or output shafts 136 and 138.

The engagement capacity of the 3-4 clutch 222 is determined by the frictional coefficient of the plates of the clutch and the pressure applied to those plates. The TCM 210 controls the 2-4 band actuator 224 and the 3-4 clutch actuator 226. When shifting from second to third gear, for example, the 2-4 band 220 is gradually released as the 3-4 clutch 222 is engaged.

Once the 3-4 clutch 222 is engaged, the TCM 210 instructs the ECM 130 to reduce engine torque. This standard reduction matches the speed of the engine to the speed required by the new gear ratio, and may be referred to as shift energy management (SEM). This reduction may be accomplished by retarding spark to the engine 104, and the TCM 210 may instruct the ECM 130 by how much to reduce the spark.

If the transmission 208 is worn, there may be a time before the 3-4 clutch 222 is engaged when both the 2-4 band 220 and the 3-4 clutch 222 are slipping. During this time, the engine 104 sees a diminished load, and engine torque that Is not being taken up by the load increases engine speed. This Is referred to as engine flare. Engine flare may be troubling to a driver, and may cause increased wear on components of the transmission 208.

The TCM 210 may detect this engine flare and instruct the ECM 130 to reduce torque immediately. In addition, the TCM 210 may instruct the 3-4 clutch actuator 226 to increase pressure to the 3-4 clutch 222. Engine flare can be measured by the TCM 210 as a rise in ratio between the transmission input and output shafts 136 and 138. This is because, as wheels coupled to the transmission output shaft 138 continue rolling at approximately the same speed, the speed of the transmission input shaft 136 increases with engine speed. The ratio between the transmission input and output shafts 136 and 138 is therefore an indicator of flare.

Once the 3-4 clutch 222 is engaged, the TCM 210 may return to the normal procedure of instructing the ECM 130 to reduce torque to match the newly selected gear. If this engine flare is detected multiple times, the TCM 210 may increase the default pressure applied by the 3-4 clutch actuator 226 for future shifts.

Figure 3:
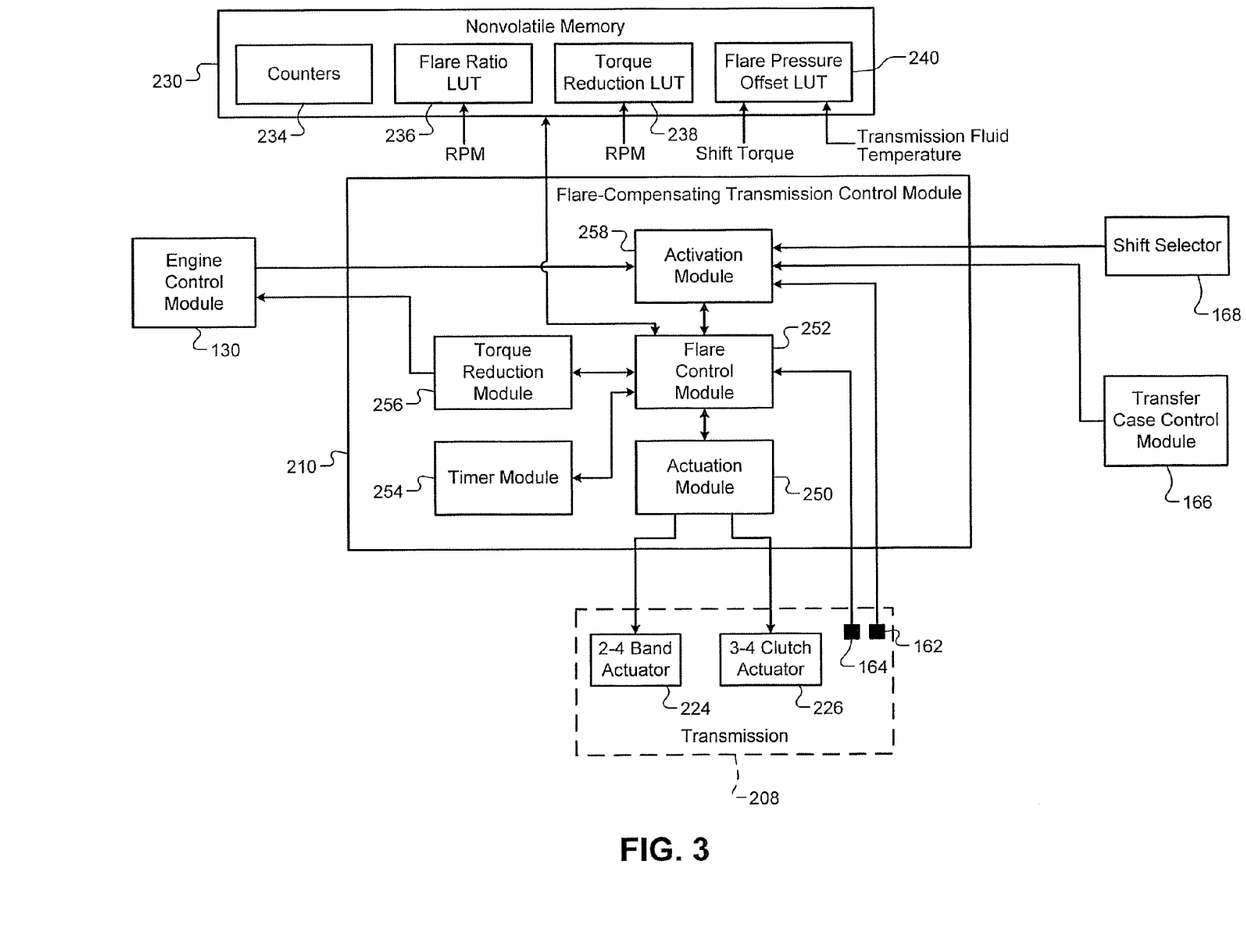
FIG. 3 is a functional block diagram of an exemplary implementation of a flare-compensating transmission control module (TCM)

Referring now to FIG. 3, a functional block diagram of an exemplary implementation of the flare-compensating transmission control module (TCM) 210 is depicted. Various calibratable parameters for detection and mitigation of flare may be stored in nonvolatile memory 230. For example, counters 234 may track the number of times that engine flare has been detected, either for a single key cycle or for the life of the vehicle. The counters 234 may be read and/or cleared by a service technician to diagnose the occurrence of flare in the transmission 208.

Nonvolatile memory 230 may include a flare ratio lookup table (LUT) 236. The flare ratio LUT 238 may determine the amount of flare that is acceptable before the TCM 210 instructs the ECM 130 to reduce torque. The flare ratio LUT 238 may be used to determine how much of a ratio change is acceptable.

The flare ratio LUT 236 may include values of acceptable ratio limits indexed by engine speed (RPM). If the ratio increases above the acceptable limit as determined by the flare ratio LUT 236, the TCM 210 may instruct the ECM 130 to reduce torque based upon values in a torque reduction LUT 238. For example only, the torque reduction LUT 238 may include values of spark retard based upon engine RPM.

The TCM 210 may also instruct the 3-4 clutch actuator 226 to apply a new pressure as determined by a flare pressure offset LUT 240. For example only, the flare pressure offset LUT 240 may provide a pressure offset based upon shift torque and transmission fluid temperature, which is then added to a base pressure value. The flare pressure offset LUT 240 may also include the base pressure value for the 3-4 clutch actuator 226, which may be increased to mitigate flare in future shifts.

The TCM 210 may include an actuation module 250 that controls actuators, including the 2-4 band actuator 224 and the 3-4 clutch actuator 226. The actuation module 250 may be controlled by a flare control module 252. The actuation module 250 may normally be controlled by another component (not shown) of the TCM 210, while the flare control module 252 intervenes when flare is detected.

The flare control module 252 may determine that an upshift has been initiated based upon a signal from a source such as a shift control module (not shown) of the TCM 210. When an upshift has been initiated, the flare control module 252 determines from an activation module 258 whether flare detection and mitigation should be performed. The flare control module 252 may use a timer module 254 to determine which phase of the upshift the transmission 208 is currently undergoing.

The first phase of an upshift is a delay phase, in which the actuation module 250 may pre-fill hydraulic passageways and/or build hydraulic pressure. The torque phase of the upshift follows, where a second friction device begins engaging and torque is transferred from a first friction device to the second friction device. Once the second friction device is fully engaged, the inertia phase of the shift begins.

During the inertia phase, the TCM 210 normally instructs the ECM 130 to reduce torque output of the engine 104 to match the engine speed to the newly selected gear. Torque reduction may be accomplished through a torque reduction module 256, which communicates with the ECM 130 to achieve a reduction in engine torque. When flare is defected, the flare control module 252 may instruct the torque reduction module 258 to reduce engine torque. Engine flare is manifested as an unacceptable ratio rise occurring during the torque phase.

The flare control module 252 determines flare based upon the transmission ratio sensor 184 and values from the flare ratio LUT 236. The flare control module 252 may instruct the torque reduction module 256 to decrease engine torque based on values from the torque reduction LUT 238. The flare control module 252 may also increase pressure demanded by the actuation module 250 based upon the flare pressure offset LUT 240.

The activation module 258 may receive inputs from, for example, the ECM 130, the shift selector 168, the transfer case control module 166, and the transmission fluid temperature sensor 162. The input from the ECM 130 may include an engine coolant temperature signal. The activation module 258 determines whether flare detection and mitigation should be performed based on these inputs. The tests performed on these inputs are described in more detail with respect to FIG. 4. Flags may be provided to allow each of these tests to be enabled or disabled.

Figure 4:
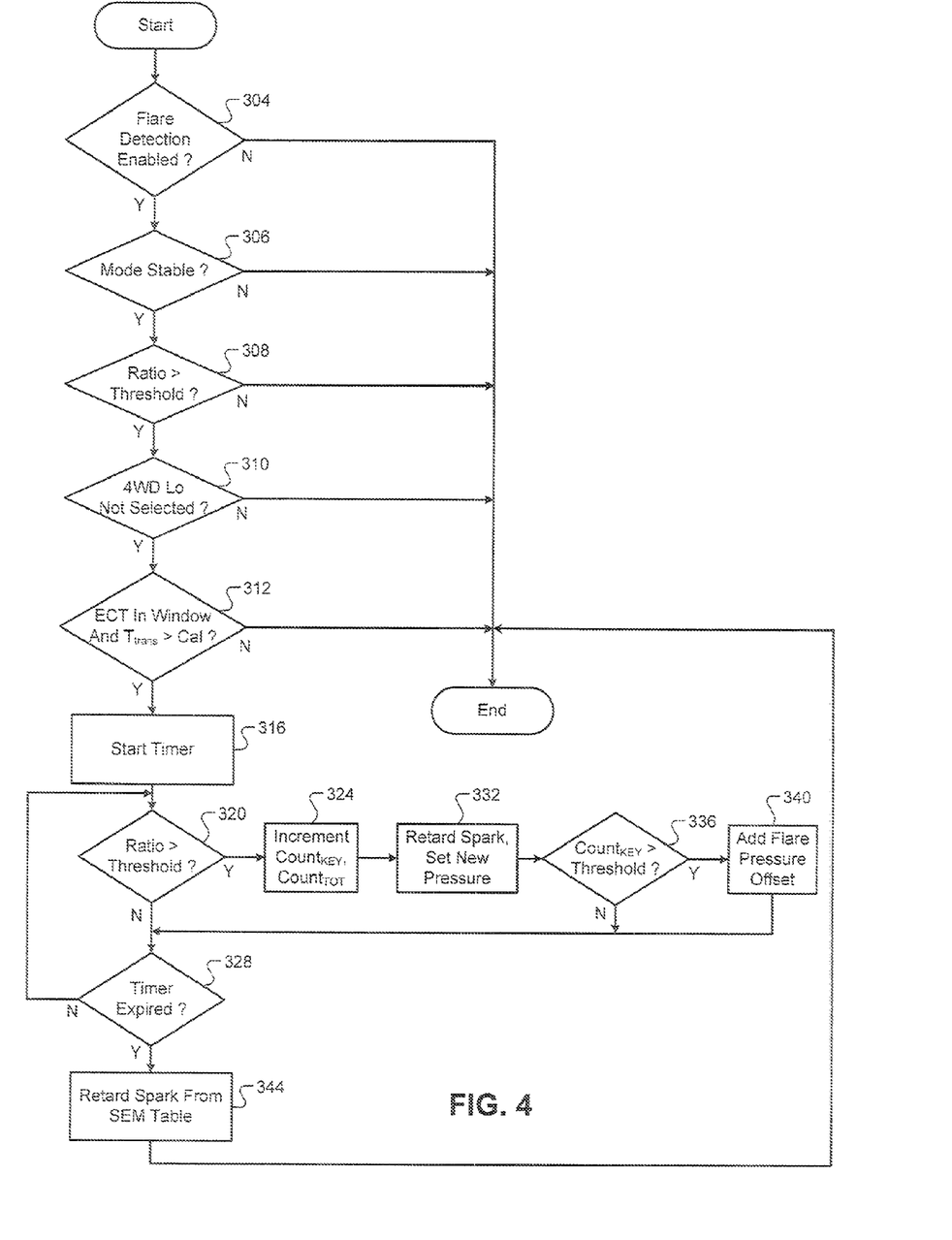
FIG. 4 is a flowchart depicting exemplary operation of the flare-compensating TCM during an upshift.

Referring now to FIG. 4, a flowchart depicts exemplary operation of the TCM 210 during an upshift. Control begins in step 304. For example only, control may begin when a shift from second to third gear is initiated. If flare detection is enabled in step 304, control transfers to step 306; otherwise, control ends.

In step 306, control determines whether the selected transmission mode has been stable. If so, control transfers to step 308; otherwise, control ends. Control may ignore defected flare when the transmission is being operated in special driving circumstances, such as when a driver is changing the selected transmission mode. For example, the driver may have moved the shift selector 168 from drive to overdrive. Control may determine that the transmission mode has been stable if the current shift is not the result of a movement of the shift selector 168.

In step 308, control determines if the ratio of the transmission input shaft 136 to the transmission output shaft 138 is less than a threshold, if so, control transfers to step 310; otherwise, control ends. If the ratio is less than the threshold, this may indicate that the driver has taken their foot off the accelerator pedal, and the engine 104 is slowing down. The ratio may change when a one-way clutch (not shown) at the input to the transmission 208 is enabled. The one-way clutch prevents the car from abruptly slowing when the driver removes their foot from the accelerator pedal and the engine 104 slows.

In step 310, control determines whether four-wheel-drive low range has been selected. If four-wheel-drive low range is not selected, control transfers to step 312; otherwise, control ends. Control may wish to disable flare detection and mitigation in the special case of four-wheel-drive low range. In step 312, control determines whether temperatures are within acceptable boundaries.

For example, control may determine whether the engine coolant temperature is within a calibratable window and whether transmission fluid temperature is greater than a calibratable threshold. If so, control transfers to step 316; otherwise, control ends. The tests performed in steps 306 to 312 may be disabled by flags in the TCM 210. In addition, an overall flare detection flag, as tested in step 304, may disable all flare detection and mitigation in the TCM 210.

In step 316, a timer is started. This timer will expire at the end of the torque phase of the upshift. Control continues in step 320, where control determines whether the current ratio of transmission input speed to output speed is greater than a threshold. If so, control transfers to set 324; otherwise, control transfers to step 328. An increased ratio may be a sign of engine flare. The threshold used in step 320 may be determined based upon engine RPM from the flare ratio LUT 236.

In step 324, two counters, which may be implemented in the counters 234 of nonvolatile memory 230, are incremented. $Count_{KEY}$ may be a count of flare events maintained since the ignition key was last placed in the run position. $Count_{TOT}$ may be a cumulative count of flare events since the counter was last cleared.

Control continues in step 332, where control instructs the ECM 130 to retard spark based upon a value from the torque reduction LUT 238. The value may be looked up from the torque reduction LUT 238 based upon engine RPM. Control may also increase pressure to the 3-4 clutch 222. This new pressure may be determined by adding a pressure offset from the flare pressure offset LUT 240 to a base value, which may also be stored in the flare pressure offset LUT 240. The pressure offset may be looked up in the flare pressure offset LUT 240 based upon shift torque and transmission fluid temperature.

Control continues in step 338, where control determines whether $Count_{KEY}$ is greater than a threshold. If so, control transfers to step 340; otherwise, control transfers to step 328. In step 340, engine flare has been detected enough times that a new default pressure is created. This will cause the 3-4 clutch actuator 228 to use an increased pressure to the 3-4 clutch 222 in future shifts, which may mitigate future flare.

In step 328, control determines whether the timer has expired, if so, control transfers to step 344; otherwise, control returns to step 320. The timer will expire at the end of the torque phase of the upshift, at which point control will continue in step 344. In step 344, engine torque is reduced according to the normal inertia phase engine speed reduction. For example, spark may be retarded based upon a value from a shift energy management (SEM) table. Control then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A transmission control module comprising:
an actuation module that controls actuation of a friction device used in shifting from a first value of a transmission ratio to a second value of the transmission ratio, wherein the transmission ratio is based on an input speed of a transmission divided by an output speed of the transmission and wherein the first value is greater than the second value;
a flare control module, wherein in response to a measurement of the transmission ratio exceeding a threshold during a torque phase of a shift from the first value to the second value, (i) the flare control module selectively generates an engine torque reduction request and (ii) the actuation module increases a hydraulic pressure applied to the friction device; and
a timer that times the torque phase of the shift, wherein the timer starts at a beginning of the shift and expires after a predetermined period,
wherein the predetermined period corresponds to a duration of the torque phase,
wherein the flare control module maintains a count that is incremented each time the transmission ratio measurement is greater than the threshold,
wherein, while the timer has not expired, in response to each measurement of the transmission ratio that exceeds the threshold, the actuation module further increases the hydraulic pressure applied to the friction device,
wherein in response to the count exceeding a predetermined number, the actuation module increases a default hydraulic pressure to the friction device for future shifts from the first value to the second value, and
wherein the predetermined number is an integer greater than zero.

2. The transmission control module of claim 1 wherein the engine torque reduction request instructs an engine control module to retard spark delivery to an engine.

3. The transmission control module of claim 2 wherein the flare control module determines an amount of spark retard from a lookup table.

4. The transmission control module of claim 3 wherein the lookup table is indexed by a speed of the engine.

5. The transmission control module of claim 1 wherein the flare control module determines the threshold from a lookup table.

6. The transmission control module of claim 5 wherein the lookup table is indexed by a speed of an engine.

7. The transmission control module of claim 1 wherein the actuation module determines the hydraulic pressure increase from a lookup table.

8. The transmission control module of claim 7 wherein the lookup table is indexed by shift torque and transmission fluid temperature.

9. The transmission control module of claim 1 wherein the transmission includes four forward transmission ratios, the first value corresponds to a second-highest gear ratio of the four forward transmission ratios, and the second value corresponds to a third-highest gear ratio of the four forward transmission ratios.

10. The transmission control module of claim 9 wherein the friction device comprises a band that is used to engage the second-highest gear ratio and a fourth-highest gear ratio of the four forward transmission ratios, and further comprising a second friction device that comprises a clutch that is used to engage the third-highest gear ratio and the fourth-highest gear ratio.

11. A method comprising:
controlling actuation of a friction device used in shifting from a first value of a transmission ratio to a second value of the transmission ratio, wherein the transmission ratio is based on an input speed of a transmission divided by an output speed of the transmission and wherein the first value is greater than the second value;

in response to a measurement of the transmission ratio exceeding a threshold during a torque phase of a shift from the first value to the second value, (i) selectively generating an engine torque reduction request and (ii) increasing a hydraulic pressure applied to the friction device;

starting a timer at a beginning of the shift, wherein the timer expires after a predetermined period, and wherein the predetermined period corresponds to a duration of the torque phase for the shift;

maintaining a count of occurrences of the transmission ratio measurement being greater than the threshold, including incrementing the count each time the transmission ratio measurement is greater than the threshold;

while the timer has not expired, in response to each measurement of the transmission ratio that exceeds the threshold, further increasing the hydraulic pressure applied to the friction device; and in response to the count exceeding a predetermined number, increasing a default hydraulic pressure to the friction device for future shifts from the first value to the second value, wherein the predetermined number is an integer greater than zero.

12. The method of claim 11 wherein the engine torque reduction request instructs an engine control module to retard spark delivery to an engine.

13. The method of claim 12 further comprising determining an amount of spark retard from a lookup table.

14. The method of claim 13 wherein the lookup table is indexed by a speed of the engine.

15. The method of claim 11 further comprising determining the threshold from a lookup table.

16. The method of claim 15 wherein the lookup table is indexed by a speed of an engine.

17. The method of claim 11 further comprising determining the hydraulic pressure increase from a lookup table.

18. The method of claim 17 wherein the lookup table is indexed by shift torque and transmission fluid temperature.

19. The method of claim 11 wherein the transmission includes four forward transmission ratios, the first value corresponds to a second-highest gear ratio of the four forward transmission ratios, and the second value corresponds to a third-highest gear ratio of the four forward transmission ratios.

20. The method of claim 19 wherein the friction device comprises a band that is used to engage the second-highest gear ratio and a fourth-highest gear ratio of the four forward transmission ratios.

* * * * *